Feb. 15, 1966   C. I. CLAUSING   3,235,773
TWO-POLE HIGH SPEED BREAKER
Filed Sept. 16, 1963
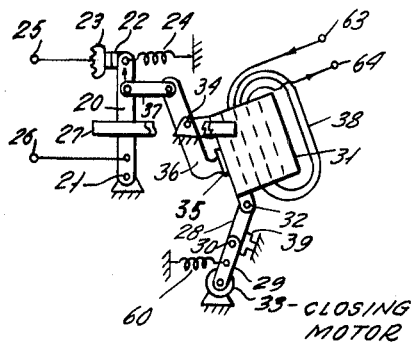
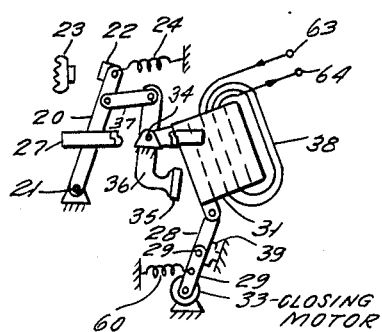
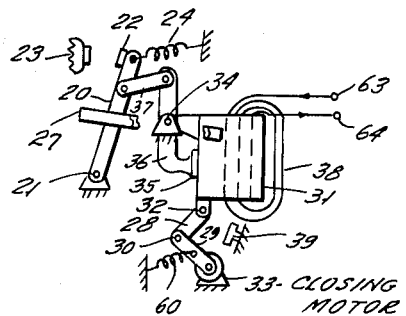
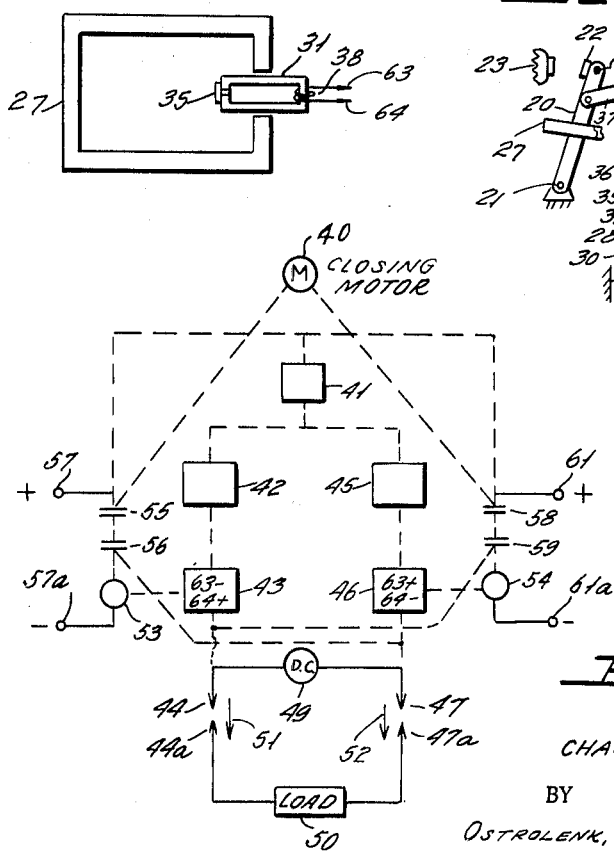
INVENTOR.
CHALLISS I. CLAUSING
BY
OSTROLENK, FABER, GERB & SOFFEN
ATTORNEYS United States Patent Office 3,235,773
Patented Feb. 15, 1966

3,235,773
TWO-POLE HIGH SPEED BREAKER
Challiss I. Clausing, Westmont, Collingswood, N.J., assignor to I-T-E Circuit Breaker Company, Philadelphia, Pa., a corporation of Pennsylvania
Filed Sept. 16, 1963, Ser. No. 309,238
7 Claims. (Cl. 317—43)

This invention relates to a two-pole high speed breaker of the current limiting type and more specifically relates to a two-pole breaker for a D.-C. system requiring high speed tripping for a high rate of change of current due to a fault either in the positive or negative direction.

This application is a continuation-in-part of my application Serial No. 26,854 filed May 4, 1960, now abandoned, entitled "Two-Pole High Speed Breaker" assigned to the assignee of the instant application.

High speed current limiting circuit breakers for D.-C. systems are well-known to the art and are set forth, for example, in:

| United States patent number | Issued | Title | Inventor(s) |
| --- | --- | --- | --- |
| 2,412,247 | 12/10/46 | Circuit Breaker Holding Magnet and Armature. | Donald I. Bohn. |
| 2,821,586 | 1/28/58 | Motor Operated Circuit Breaker and Disconnect Switch. | Donald I. Bohn. |
| 2,850,596 | 5/9/55 | Single Solenoid for Operating A Series Connected Circuit Breaker and Disconnect Switch. | C. I. Clausing. |
| 2,881,283 | 4/7/59 | Magnetic Latch Calibration System. | C. I. Clausing. |
| 2,881,287 | 4/7/59 | Magnetic Latch System for. | C. I. Clausing. |
| 2,891,123 | 6/16/59 | High Speed Circuit Breaker. | C. I. Clausing. |
| 2,905,865 | 9/22/59 | Flux Shifting. Trip Magnet for Circuit Breaker. | C. I. Clausing et al. |
| 2,939,930 | 6/7/60 | Motor Closing Mechanism for Circuit Breakers. | C. I. Clausing. |
| 2,986,618 | 4/30/61 | Time Delay Tripping Feature for High Speed Breakers. | C. I. Clausing. |
| 3,028,527 | 4/3/62 | Anti-Pump Control Scheme for Motor Closed Circuit Breaker. | F. J. Pokorny & C. I. Clausing. |
| 3,048,679 | 8/7/62 | Trip System for High Speed Circuit Breakers. | C. I. Clausing. |

All of the aforementioned United States Patents being assigned to the assignee of the instant invention.

These devices typically use a so-called magnetic latch wherein the circuit breaker contacts are strongly biased to a disengaged position and are latched in an engaged position by a magnetic seal which may be defeated by excessive ampere turns through the circuit being protected which are passed through a winding on the magnetic latch. Because of the nature of the magnetic latch, this winding or so-called bucking bar will operate to defeat the magnetic seal when the current in the system being protected either rises or reverses direction, but not both.

There are, however, many applications wherein high speed tripping is necessary under either of those conditions. By way of example, in a rectifier installation it is possible that the circuit being protected by the circuit breakers will have a fault causing it to attempt to conduct a negative current with respect to a previously established positive D.-C. current whereby the circuit breaker is called upon to rapidly disconnect the circuit under this negative type of fault. In the same system, however, and where several rectifiers each having their own respective high speed protective circuit breaker are connected in parallel, the failure of one or more of the parallel connected breakers will require the remaining rectifier units to supply the load current whereby the current through each of the remaining circuit breakers rises in a positive direction with an extremely rapid rate of rise of the current to satisfy this current requirement. These overcurrents are in some instances high enough to severely damage the remaining equipment so it is necessary that the remaining rectifiers be removed from the line under this positive type of condition. When, however, the circuit breakers are equipped to have their magnetic latch operate only during the previously described fault condition where the current decreases in a negative direction, auxiliary means have been required to make the latch structure responsive to positive type faults as well.

Although these solutions which require the addition of auxiliary coils and trip elements have solved the problem referred to, the speed of tripping in the direction opposite the preferred direction determined by the bucking bar has not been as fast as in the preferred direction.

In the present invention the circuit breaker is comprised of two individual poles which are electrically connected in series with the circuit being protected with the magnetic trip structures of each being adjusted to have their preferred tripping direction in opposing directions. Thus, where there is a negative type of fault, the first pole will serve as a high speed tripping device. When there is a fault in the opposite direction, the second pole will serve as the high speed tripping device.

Accordingly, maximum speed of tripping and current limiting is achieved with the present invention, whether the fault to be cleared is one in which the current rises in a positive direction or decreases in a negative direction.

In addition to this highly desirable result, the pole of the circuit breaker which is not used for high speed tripping is used as a disconnect means for the circuit by interlocking the two poles in such a manner that the second pole will open after the high speed operation is achieved. The requirement of a disconnect means in D.-C. circuits using high speed circuit breakers is well known to the art, and is necessary to achieve complete isolation of a load after a circuit breaker connected on one side of the load has been opened. Since, in the present invention there are two poles available, the pole not used for the high speed tripping operation has been found to be ideally adapted to serve the purpose of this disconnect function.

Accordingly, a primary object of this invention is to provide a two-pole circuit breaker for D.-C. circuits.

Another object of this invention is to provide a novel circuit interrupting device having two poles which are respectively adapted to trip for fault currents in a positive direction or in a negative direction respectively.

Another object of this invention is to provide a novel two-pole high speed circuit breaker for D.-C. circuit protection wherein the preferred high speed tripping direction of the poles are in opposite directions.

A further object of this invention is to provide a novel two-pole high speed circuit breaker wherein one pole will operate in a high speed manner responsive to a fault condition, while the other pole will operate subsequent to the high speed pole operation to serve as a disconnect.

These and other objects of this invention will become apparent from the following description when taken in connection with the drawings, in which:

FIGURE 1 schematically illustrates one pole of a high speed D.-C. circuit breaker of the type to which the present invention is directed where the circuit breaker is in its engaged position.

FIGURE 2 is similar to FIGURE 1 and illustrates the circuit breaker in the disengaged position after a fault condition.

FIGURE 3 illustrates the circuit breaker of FIGURES 1 and 2 after the circuit breaker is reset and ready to be closed.

FIGURE 4 shows a top view of the magnetic shunt for the magnetic latch of the circuit breaker of FIGURES 1, 2 and 3.

FIGURE 5 schematically illustrates the manner in which two poles of the type shown in FIGURES 1 through 4 can be combined in a coordinated interrupting device so that one pole has a first direction of high speed trip, while the second pole has a second direction of high speed trip, and the pole which does not trip under high speed conditions serves as an automatic disconnect for the circuit being protected.

Referring now to FIGURES 1, 2 and 3, the circuit breaker illustrated schematically is of the type fully set forth in aforementioned United States Patents 2,939,930 and 2,891,123, which are incorporated herein as part of the instant application.

In essence, the circuit breaker is comprised of a movable contact arm 20 which is pivotally mounted at a relatively stationary pivot 21 and carries a movable contact element 22 at the upper end thereof. The movable contact arm 20 moves movable contact 22 between an engaged position (FIGURE 1) with respect to a stationary contact 23 which is carried from some relatively stationary portion of the mounting structure and a disengaged position (FIGURE 2). The contact arm 20 is normally biased toward the disengaged position of FIGURES 2 and 3 by a relatively powerful spring 24 which has one end connected to contact 22 and its other end connected to a relatively stationary body.

The electrical circuit being controlled by cooperable contacts 22 and 23 is illustrated in FIGURE 1 as extending from terminals 25 which are connected to the stationary contacts 23 and 26 which are connected to the lower end of contact arm 20. The contact arm, which is a conductive member, passes through a magnetic shunt 27 (FIGURE 4) which, as will be seen hereinafter, delivers a tripping signal to the magnetic latch system to indicate the existance of fault current in a predetermined direction through contact arm 20 to initiate tripping of the system in a high speed manner.

The operating mechanism for contact arm 20 includes a toggle system composed of toggle links 28 and 29 which are pinned together by pin 30, and have their output connected to magnetic body 31 at pivot 32 and their lower end connected to a driving motor 33 which acts through a clutch means (not shown). The magnetic structure 31 is pivotally mounted at its upper portion to a relatively stationary pivot 34 so that the toggle system of links 28 and 29 will cause movement of magnetic structure 31 about this pivot.

The armature which is movable between sealing and unsealing relation with respect to magnetic structure 31 includes an armature 35 carried by beam 36 which is pivotally mounted at pivot 34 which also carries magnetic structure 31. The upper end of beam 36 is then pivotally connected to link 37 which has its left-hand end pivotally connected to contact arm 20.

In operation, and referring to the reset condition of FIGURE 3, prior to the time that the main contacts 22 and 23 are closed, a polarizing flux is established in magnet structure 31 by passing a D.-C. current through its polarizing coil 38. This will cause the armature 35 carried at the lower end of beam 36 to be attracted against the face of magnet structure 31 in the manner shown in FIGURE 3. Thereafter, the closing motor 33 is energized to drive toggle link 29 in a clockwise direction and thus drive magnet structure 31 in a counterclockwise direction about its pivot 34 which, in turn, will cause beam 36 to rotate in a counterclockwise direction to thus move contact arm 20 to the engaged position shown in FIGURE 1. The toggle knee at pin 30 at this point moves over center and is restrained from further motion by fixed stop 39.

The clutch means mentioned above is provided within the motor driving system 33 in order to prevent a continued transfer of power through the mechanical linkage which is a rigid linkage to the contact when the magnetic latch is in its sealed condition and prior to the time that the motor is deenergized.

When the contacts are thus closed, and assuming that a circuit is connected at terminals 25 and 26 of FIGURE 1 to cause a current flow through contact arm 20 and contacts 22 and 23, a magnetic flux of given magnitude will be established in magnetic shunt 27. The flux generated in shunt 27 will interact in a predetermined manner with the flux generated by polarizing coil 38. By way of example, if it is intended to cause high speed operation responsive to reversal of current in the circuit and thus through contact arm 20, the flux normally established in shunt 27 may be in a direction to aid the flux established by polarizing coil 38 to retain the armature 35 sealed to magnetic structure 31. Thus, when the flux of shunt 27 reverses, it will oppose the effect of polarizing coil 38 to permit release of armature 36.

If, on the other hand, it is intended to cause high speed operation of the circuit when the current through contact arm 20 and thus the circuit rapidly increases in a positive direction, the normal amount of flux generated in shunt 27 will be insufficient to defeat the effect of the flux generated by polarizing coil 38, while if the current increases in a predetermined manner under fault conditions, the fault will rise to a sufficient value to defeat the polarizing flux and achieve release of armature 35.

Thus, the direction of energization of polarizing coil 38 will determine whether the circuit breaker of FIGURES 1–3 will trip on the occurrence of reverse current or forward fault current. When the terminals 63 and 64 are energized from a source so that terminal 63 is positive with respect to terminal 64, the flux in shunt 27 for normal load current will be in the same direction as the flux in core 31 generated by the polarizing coil 38. Hence on the occurrence of a reverse current the flux in shunt 27 will be reversed and the magnetic latch of armature 36 will be released. However, when the circuit breaker of FIGURES 1, 2 and 3 is to be responsive to forward fault currents, the terminals 63 and 64 are energized from a source so that terminal 63 is negative with respect to terminal 64. Thus the flux in shunt 27, for normal load currents, will be an opposite direction to the flux in core 31 generated by the polarizing coil 38. This normal amount of flux generated in shunt 27 will be insufficient to defeat the effect of the flux generated by polarizing coil 38. However, on the occurrence of a forward fault current the flux in shunt 27 will be increased to such a large magnitude as to defeat the flux from polarizing coil 38, and the magnetic latch of armature 36 will be released. Thus, as one pole of the circuit breaker, such as 46 of FIGURE 5, is polarized to trip on reverse current and the other pole, such as 43 of FIGURE 5, is polarized in the opposite sense so that high speed operation will occur on a forward fault current. Thus, when terminal 63 is negative and the circuit current through arm 20 raises, it progressively builds up a flux in shunt 27 which opposes the normal flux of polarizing coil 38 and at a predetermined magnitude of forward fault current the armature 35 will be released and trip the pole 43. On the other hand, when the terminal 63 is positive and as the circuit current through arm 20 reverses, it progressively builds up a flux in shunt 27 which opposes the normal flux of polarizing coil 38 and at a predetermined magnitude of reverse current the armature 35 will be released and trip the pole 46. Thus, either pole is capable of clearing the circuit individually and each for a predetermined direction of current flow. With one pole of this circuit breaker polarized to trip on reverse current, the second pole may be polarized in opposite sense so that high speed operation will occur on a forward fault current. Thus, as the circuit current through arm 20 rises, it progressively builds up flux in shunt 27 which opposes the normal polarizing flux of polarizing coil 38. At a predetermined magnitude of fault current the armature 35 will be released and trip the second pole. Thus either pole is capable of clearing the circuit individually and each in a pre-chosen direction.

The mode of high speed operation of the circuit breaker is, therefore, seen to depend only on the polarity and magnitude of current generated in polarizing coil 38. Whichever operation causes a decrease of holding flux through armature 35, the armature will be released, as seen in FIGURE 2, whereby the powerful opening springs 24 will move the contact arm 20 and the movable contact 22 rapidly to the right to achieve high speed contact separation independently of magnetic structure 31 and the operating mechanism connected to drive magnet structure 31. Thereafter, and under the influence of a relatively light spring 60, the toggle formed by the links 28 and 29 is collapsed to the left, as shown in FIGURE 3, and the magnetic structure 31 is rotated clockwise to be resealed with respect to armature 35. Therefore, the circuit is automatically reset, and its tripping operation will be trip-free.

In accordance with the present invention, a first and second pole of the type shown in FIGURES 1, 2 and 3 are combined in a coordinated unit as by assembling the two poles parallel to one another. This novel structure is schematically illustrated in FIGURE 5.

Referring to FIGURE 5, a common motor-closing mechanism 40 similar to the motor of the motor control mechanism 33 of FIGURES 1 and 3 is schematically illustrated. In FIGURE 5 all of the dotted lines flowing throughout the drawing schematically illustrate mechanical connections. Thus, motor 40 is mechanically connected to a first pole through a clutch mechanism 41 and operating mechanism 42, a magnetic latch system 43 to a movable contact 44 which cooperates with a stationary contact 44a. The second pole of the invention shares clutch 41 and motor 40 with the first pole and includes operating mechanism 45 connected to clutch 41, a magnetic latch system 46 which is driven from operating mechanism 45, and the movable contact 47 which is movable into and out of engagement with a relatively stationary contact 47a.

In the illustration of FIGURE 5, the operating mechanism 42, magnetic latch system 43, and cooperating contacts 44–44a are identical to the circuit breaker described in connection with FIGURES 1–4 and have polarizing coil 38 energized with terminal 63 being negative with respect to terminal 64 so that the circuit breaker interrupts on the occurrence of forward fault currents. The operating mechanism 45, magnetic latch system 46 and cooperating contacts 47–47a are also identical to the circuit breaker described in connection with FIGURES 1–4 and have polarizing coil 38 energized with the terminal 63 being positive with respect to terminal 64 so that the circuit breaker interrupts on the occurrence of reverse current.

It will be apparent that in each of the two poles, the operating mechanism and magnetic latch may be identical to those described in FIGURES 1 and 2 where the input to the operating mechanism is derived from the common motor 40.

The two-pole breaker thus formed is connectable in circuit relation with a source of power 49 which is preferably, although not necessarily, a D.-C. source, and a load 50 which is to be energized from D.-C. source 49. The pole formed of contacts 44 and 44a is on one side of load 50, while the pole formed of contacts 47 and 47a is on the other side of load 50 whereby when one of the poles operates as a high speed interrupting device, the other of the poles may operate as a disconnect device to fully isolate load 50.

The first of the poles such as the pole including contacts 44 and 44a will trip in the high speed forward direction of current change indicated by arrow 51. The second pole including contacts 47 and 47a will trip in a high speed manner responsive to current changes in a direction opposite to that of the first pole, as indicated by arrow 52. This selection of preferred direction of high speed trip is, of course, controlled by controlling the polarizing coils such as polarizing coil 38 of FIGURES 1, 2 and 3 of the magnetic latches 43 and 46.

Accordingly, regardless of the direction of the fault current, high speed current interruption is achieved by means ideally adapted for interruption of such high speed currents. Furthermore, and as has been pointed out previously, the circuit interrupter which does not serve as a high speed current interrupting device because the fault current was in a direction opposite to its preferred direction of tripping may serve as a disconnect means for the circuit.

For this purpose, an electrical interlock means is provided, as is further schematically illustrated in FIGURE 5. More specifically, the magnetic latches 43 and 46 of the first and second poles may be controlled to release their respective armatures and thus permit circuit interruption responsive to operation of auxiliary trip coil means such as auxiliary trip coils 53 and 54, respectively, which are operatively connected to magnetic latches 43 and 46, as indicated by dotted lines.

This trip coil is arranged as disclosed in aforementioned U.S. Patent 3,048,679 or could, for example, cause the operation of a contact which would disconnect the source of polarizing current from the polarizing coil of the magnetic latch to permit release of the armature (and likewise prevent securement) of the magnetic latch. Auxiliary trip coil 53 is then connected in series with contacts 55 and 56 and a source of D.-C. voltage at terminals 57 and 57a. In a similar manner, auxiliary trip coil 54 is connected in series with contacts 58 and 59 and a source of D.-C. voltage at terminals 61 and 61a. Obviously, the same voltage source can be used for each of coils 53 and 54.

As schematically illustrated, contacts 55 and 58 are mechanically connected to the output shaft of motor 40 so that when the output shaft of motor 40 is in a position to indicate that both poles are open (FIGURE 3), the contacts are open.

Thus, when the motor is in the position such that the two-pole circuit breaker is opened, coils 53 and 54 cannot be energized. When the motor system 40 is driven to close the two poles, contacts 55 and 58 are closed, and the only contacts preventing energization of coils 53 and 54 are the contacts 56 and 59, respectively. Contact 56 which controls the energization of coil 53 of the left-hand pole is operated responsive to the position of movable contact 47 of the opposite pole, whereby, so long as the pole including contact 47 is closed, contact 56 is open. In a like manner, contact 59 is interlocked with movable contact 44 of the other pole, whereby contact 59 is maintained open so long as pole 44 is closed. When contacts 44 or 47 open, the auxiliary contacts 59 or 56, respectively, are closed.

Accordingly, and assuming that the pole including movable contact 44 is open due to a fault in its preferred direction, the contact 59 of the opposite pole is closed to complete a circuit through its auxiliary trip coil 54. Accordingly, after the fault has been cleared through the high speed operation of the left-hand pole, the magnetic latch 46 of the right-hand pole will be defeated, and the contacts of the right-hand pole operate as a disconnect means for the load 50.

It will be noted that during the closing operation, the operation of contacts 56 and 59 due to the closing of main contacts 44 and 47 is such that they are opened before contacts 55 and 58 are closed, due to operation of motor system 40 to prevent the unintentional operation of trip coils 53 and 54 during the closing operation.

The several advantages of the present invention which will be readily apparent to those skilled in the art, among others, are that a common closing mechanism 40 and 41 may be used in the manner of standard multi-pole circuit breakers. Furthermore, independent calibration for each pole is permissible so that any desired combination of forward or reverse tripping characteristics under high speed is possible. Moreover, the force-to-mass ratio for the system is substantially the same as in a single pole construction so that equally fast operation is obtained.

Although this invention has been described with respect to its preferred embodiments, it should be understood that many variations and modifications will now be obvious to those skilled in the art, and it is preferred, therefore, that the scope of this invention be limited not by the specific disclosure herein but only by the appended claims.

The embodiments of the invention in which an exclusive privilege or property is claimed are defined as follows:

1. A two-pole high-speed breaker; said two-pole high-speed breaker comprising a first and second pole each having a respective magnetic latch means; each of said magnetic latch means having a preferred direction of high speed operation for the direction of change of current under fault conditions; said first pole and said second pole being electrically connected in series relation with a source of power and a load; said direction of high speed trip for said first pole being opposite the direction of high speed trip for said second pole; said magnetic latch system for said first pole being interlocked with said magnetic latch system for said second pole; said magnetic latch system for said first and second poles being operable subsequent to the operation of said magnetic latch system for said second and first poles, respectively, through said interlock means.

2. A two pole high speed circuit breaker; said two pole high speed circuit breaker comprising a first and second pair of cooperable contacts each movable between an engaged and disengaged position; each of said first and second pair of cooperable contacts having respective biasing means connected thereto to bias said first and second pair of contacts respectively to their said disengaged position; each of said pair of first and second cooperable contacts having respective magnetic latch means operatively connected thereto to latch said respective first and second pair of cooperable contacts in their said engaged position against the biasing force of said respective biasing means; each of said magnetic latch means being movable to an unlatched position at high speed responsive to a predetermined change in current in one direction through the contacts of their respective pair of cooperable contacts to impart high speed tripping to said pole including said pair of contacts responsive to said predetermined change in current; said first and second pair of cooperable contacts being electrically connected in series; said magnetic latch means for said first pair of cooperable contacts being operable responsive to a positive rate of change of current through said pairs of cooperable contacts; said magnetic latch means for said second pair of cooperable contacts being operable responsive to a negative rate of change of current through said pairs of cooperable contacts; and a closing means operatively connected to said pairs of cooperable contacts; said closing means being common to each of said pairs of cooperable contacts and being operable to move said pairs of cooperable contacts from said disengaged position to said engaged position; interlock means; said interlock means comprising first and second auxiliary trip means coupled to said respective magnetic latch means of said first and second pairs of cooperating contacts; said first and second auxiliary trip means being mechanically cross coupled to said second and first cooperating contacts, respectively, for unlatching one of said magnetic latch means when the cooperating contacts associated with the remaining magnetic latch means moves to the disengaged position.

3. A two pole high speed circuit breaker; said two pole high speed breaker comprising a first and second pair of cooperable contacts each movable between an engaged and disengaged position; each of said first and second pair of cooperable contacts having respective biasing means connected thereto to bias said first and second pair of contacts respectively to their said disengaged position; each of said pair of first and second cooperable contacts having respective magnetic latch means operatively connected thereto to latch said respective first and second pair of cooperable contacts in their said engaged position against the biasing force of said respective biasing means; each of said magnetic latch means being movable to an unlatched position at high speed responsive to a predetermined change in current in one direction through the contacts of their respective pair of cooperable contacts to impart high speed tripping to said pole including said pair of contacts responsive to said predetermined change in current; said first and second pair of cooperable contacts being electrically connected in series; said magnetic latch means for said first pair of cooperable contacts being operable responsive to a positive rate of change of current through said pairs of cooperable contacts; said magnetic latch means for said second pair of cooperable contacts being operable responsive to a negative rate of change of current through said pairs of cooperable contacts; said pairs of cooperable contacts being connected in a D.-C. circuit; said pairs of cooperable contacts clearing a fault in said D.-C. circuit at high speed regardless of the direction of the rate of change of current in said D.-C. circuit; interlock means; said interlock means comprising first and second auxiliary trip means coupled to said respective magnetic latch means of said first and second pairs of cooperating contacts; said first and second auxiliary trip means being mechanically cross coupled to said second and first cooperating contacts, respectively, for unlatching one of said magnetic latch means when the cooperating contacts associated with the remaining magnetic latch means moves to the disengaged position.

4. A two pole high speed circuit breaker; said two pole high speed circuit breaker comprising a first and second pair of cooperable contacts each movable between an engaged and disengaged position; each of said first and second pair of cooperable contacts having respective biasing means connected thereto to bias said first and second pair of contacts respectively to their said disengaged position; each of said pair of first and second cooperable contacts having respective magnetic latch means operatively connected thereto to latch said respective first and second pair of cooperable contacts in their said engaged position against the biasing force of said respective biasing means; each of said magnetic latch means being movable to an unlatched position at high speed responsive to a predetermined change in current in one direction through the contacts of their respective pair of cooperable contacts to impart high speed tripping to said pole including said pair of contacts responsive to said predetermined change in current; said first and second pair of cooperable contacts being electrically connected in series; said latch magnetic means for said first pair of cooperable contacts being operable responsive to a positive rate of change of current through said pairs of cooperable contacts; said magnetic latch means for said second pair of cooperable contacts being operable responsive to a negative rate of change of current through said pairs of cooperable contacts; and interlock means; said interlock means comprising first and second auxiliary trip means coupled to said respective magnetic latch means of said first and second pairs of cooperating contacts; said first and second auxiliary trip means being mechanically cross coupled to said second and first cooperating contacts, respectively, for unlatching one of said magnetic latch means when the cooperating contacts associated with the remaining magnetic latch means moves to the disengaged position.

5. The breaker structure of claim 4, wherein each auxiliary trip coil means is comprised of a source of energy, a third pair of contacts and an auxiliary trip coil all being electrically connected in series fashion.

6. The breaker apparatus of claim 5, wherein each of said third pair of contacts is mechanically cross coupled to the opposite pair of circuit breaker cooperating contacts to close only when said opposite pair of circuit breaker cooperating contacts becomes disengaged.

7. The breaker apparatus of claim 6, wherein each of said series connected electrical circuit further comprises a fourth pair of contacts; a common closing means for resetting said magnetic latch means and being mechanically coupled to the fourth pair of contacts in each series connected electrical circuit to close said fourth pair of contacts.

References Cited by the Examiner
UNITED STATES PATENTS

| | | | |
|---|---|---|---|
| 1,687,515 | 10/1928 | Roberson | 200—102 XR |
| 2,821,586 | 1/1958 | Bohn | 200—89 X |

SAMUEL BERNSTEIN, *Primary Examiner*.